United States Patent [19]
Frank

[11] 3,799,133
[45] Mar. 26, 1974

[54] SOLENOID VALVE CONTROL FOR EXHAUST GAS RECIRCULATION

[75] Inventor: Daniel L. Frank, Troy, Mich.

[73] Assignee: General Motors Corporation, Detroit, Mich.

[22] Filed: June 22, 1972

[21] Appl. No.: 265,267

[52] U.S. Cl............................................. 123/119 A
[51] Int. Cl............................................. F02m 25/06
[58] Field of Search............................... 123/119 A

[56] References Cited
UNITED STATES PATENTS

| | | | |
|---|---|---|---|
| 3,673,993 | 7/1972 | Nakajima et al................ | 123/119 A |
| 2,701,556 | 3/1955 | Woerner.......................... | 123/119 A |
| 3,678,904 | 7/1972 | Scholl et al..................... | 123/32 EA |

Primary Examiner—Laurence M. Goodridge
Attorney, Agent, or Firm—Peter D. Sachtjen

[57] ABSTRACT

A solenoid valve which regulates exhaust gas recirculation in an internal combustion engine is controlled by an electrical circuit responsive to engine speed and intake manifold pressure.

2 Claims, 1 Drawing Figure

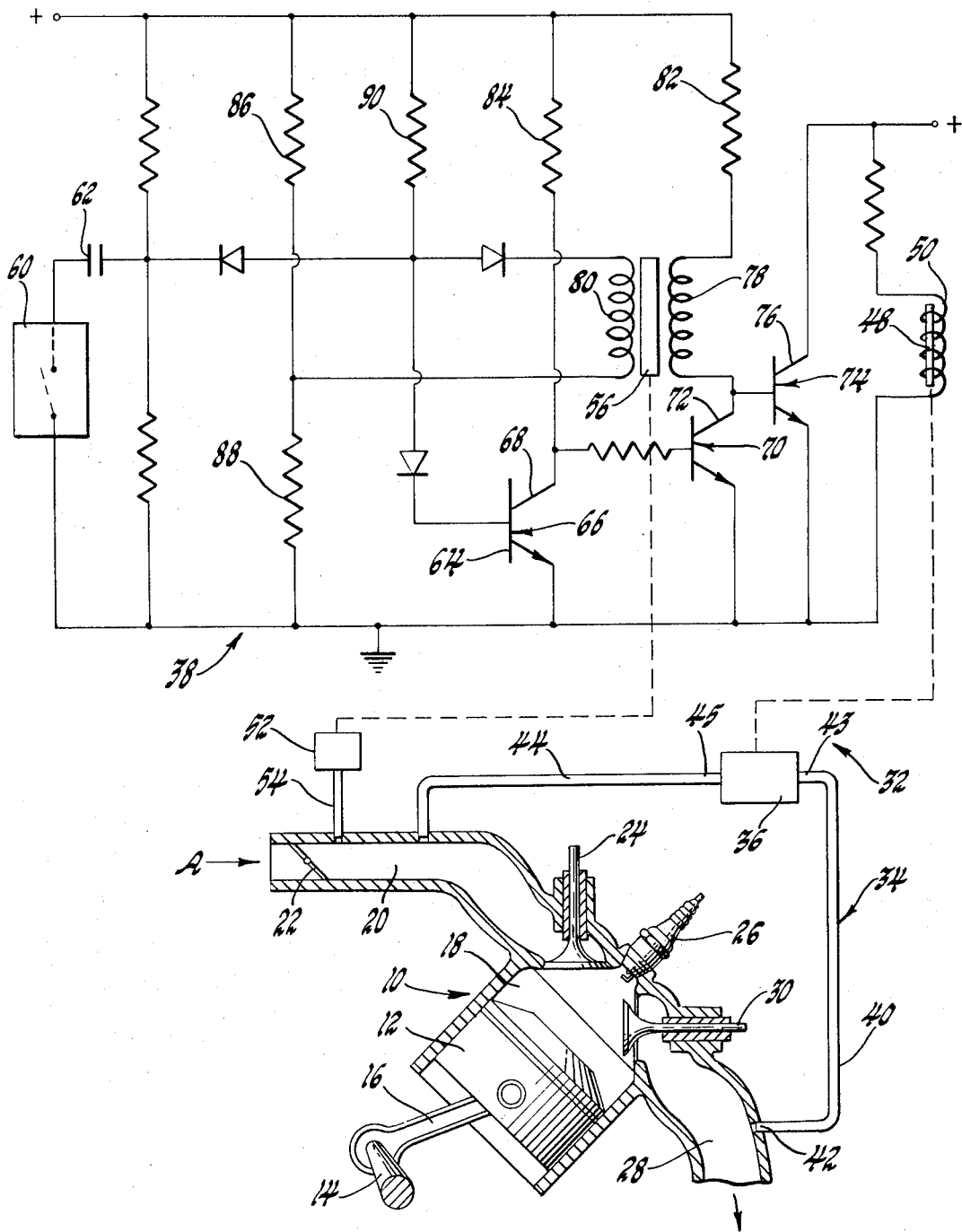

SOLENOID VALVE CONTROL FOR EXHAUST GAS RECIRCULATION

The present invention relates to exhaust gas recirculation and, in particular, to a control for exhaust gas recirculation which provides a recirculation rate in accordance with engine operating conditions.

Exhaust gas recirculation is used in internal combustion engines to reduce combustion temperatures and thereby inhibit the formation of oxides of nitrogen. A valve is used to control the flow of gases from a passage connecting the exhaust manifold and the intake manifold. Typically, the valve gradually opens and closed in response to a selected engine condition such as exhaust gas pressure or air intake pressure. During normal driving conditions, for instance, the valve will gradually open during acceleration or high engine load and gradually close as the engine speed decreases.

The present invention takes a different approach to the control of exhaust gas recirculation by having a valve which opens and closes each engine cycle with the opening time being in accordance with engine operating conditions. In the preferred embodiment, a solenoid valve in the exhaust gas recirculation passage is controlled by an electrical circuit so as to be energized to the open position in accordance with engine speed and includes means for varying the energization time in accordance with manifold pressure.

The above and other features of the present invention will be apparent to one skilled in the art upon reading the following detailed description, reference being made to the accompanying drawings illustrating a preferred embodiment of the present invention in which FIG. 1 is a schematic of an internal combustion engine having a solenoid valve control for exhaust gas recirculation in accordance with the present invention.

Referring to the drawing, there is shown an internal combustion engine 10 having a piston 12 connected to a crankshaft 14 by a connecting rod 16. The piston 12 reciprocates within a cylindrical combustion chamber 18. The engine 10 further includes an intake passage 20 having a movable throttle 22 for controlling the flow therethrough of a combustible air fuel mixture (indicated by arrow A). The admission of the air fuel mixture to the combustion chamber 18 is conventionally controlled by an intake valve 24. This mixture is compressed by the reciprocating piston 12 and ignited by the spark plug 26. The products of combustion are exhausted through an exhaust passage 28 controlled by an exhaust valve 30.

As the combustion temperature increases, oxides of nitrogen will be increasingly formed. To inhibit the formation thereof, the engine 10 is provided with an exhaust gas recirculation control 32 comprising a recirculation passage 34 controlled by a solenoid valve 36 which is in turn regulated by an electrical control circuit 38.

The recirculation passage 34 has a first branch 40 having an inlet 42 communicating with the exhaust passage 28 and an outlet 43 at the solenoid valve 36. The recirculation passage 34 includes a second branch 44 having an inlet 45 at the solenoid valve 36 and an outlet communicating with the intake passsage 20 downstream of the throttle 22. The solenoid valve 36 is conventional in construction and serves to open the recirculation passage 34 when energized and close the recirculation passage 34 when deenergized. The solenoid valve 36 includes a movable core 48 and a coil 50 which are incorporated in the electrical control circuit 38.

A pressure transducer 52 responsive to absolute pressure is connected by a conduit 54 to the intake passage 20 downstream of the throttle valve 22. The transducer 52 serves to position a movable core 56 to control energization of the solenoid valve 36 as hereinafter explained.

The electrical control circuit 38 comprises a signal generator 60 which nominally may be considered as a normally opened switch. The signal generator 60 provides a negative voltage pulse during each cycle of the engine 10. This negative voltage pulse is differentiated by a capacitor 62 into a negative going voltage spike which is delivered to the base 64 of a transistor 66. This causes the transistor 66 to cease to conduct and the voltage at its collector 68 increases to render transistor 70 conductive. The voltage at the collector 72 of the transistor 70 then drops thereby causing an amplifying transistor 74 to cease conducting. This causes the voltage at the collector 76 of the transistor 74 to increase thereby energizing the coil 50 to shift the core 48 and cause solenoid valve 36 to open. This allows exhaust gases from the exhaust passage 28 to recirculate through the passage 34 to the intake passage 20.

As the transistor 70 starts conducting current passes through a primary winding 78 associated with the movable core 56 of the pressure transducer 52. The primary winding 78 is coupled through the core 56 to a secondary winding 80. As the current changes in the primary winding 78, a voltage is induced in the secondary winding 80 which biases the base 64 of the transistor 66 in a negative direction and holds the transistor 66 in a nonconductive state. Over a period of time, the rate of change of current in the primary winding 78 drops and the voltage induced in the secondary winding 80 reduces sufficiently to render transistor 66 conductive thereby terminating energization of the solenoid valve 36. The duration of solenoid valve energization is controlled by the impedance in the circuit including primary winding 78, resistors 82, 84, secondary winding 80, and resistors 86, 88, 90.

As previously mentioned, the pressure transducer 52 is responsive to absolute pressure in the intake passage 20 downstream of the throttle 22. Inasmuch as the induction passage pressure varies with the movement of the throttle 22 and with changes in engine load, the output of the transducer 52 and the movement of the core 56 with respect to the windings 78, 80 changes in accordance with these engine variations. Upon such a change, the core 56 moves with respect to the windings 78, 80 to increase the inductance therebetween and lengthen the time the solenoid valve 36 is energized. Thus, the recirculation rate as determined by the energization time of the solenoid valve 36 is increased and the recirculation through the passage 34 will be proportional to air flow.

This will enable a flow of exhaust gases to the combustion chamber 18 to be accurately metered with respect to the entering air fuel mixture A so as to provide an increasingly effective control for inhibiting the formation of oxides of nitrogen.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. In an internal combustion engine, an intake passage for air flow to the engine, a throttle in said intake passage for controlling air flow therethrough, an exhaust for the flow of exhaust gases from the engine, an exhaust gas recirculation passage fluidly connecting said exhaust passage with said intake passage downstream of said throttle, a valve in said exhaust gas recirculation passage for controlling flow of the exhaust gases, said valve being movable between an open position and a closed position, a solenoid operatively connected to said valve for moving said valve to said open position when energized and to said closed position when deenergized; circuit means including amplifier means for energizing and deenergizing said solenoid during each engine cycle, a pressure transducer operatively positioned at said intake passage downstream of said throttle, said transducer being responsive to absolute pressure at said intake passage which pressure varies in accordance with throttle position and engine load, said circuit means including means responsive to said transducer and operative to control energization of said amplifier means to energize said solenoid for a variable period within each engine cycle in accordance with changes in intake passage pressure produced by changes in engine load and throttle setting to thereby provide a recirculation rate proportional to engine air flow.

2. In an internal combustion engine, an intake passage for air flow to the engine, a throttle in said intake passage for controlling air flow therethrough, an exhaust for the flow of exhaust gases from the engine, an exhaust gas recirculation passage fluidly connecting said exhaust passage with said intake passage downstream of said throttle, a valve in said exhaust gas recirculation passage for controlling flow of the exhaust gases, said valve being movable between an open position and a closed position, a solenoid operatively connected to said valve for moving said valve to said open position when energized and to said closed position when deenergized; circuit means including amplifier means for controlling energization of said solenoid, said circuit means including a signal generator producing a signal on each engine cycle and means to condition said amplifier means to energize and deenergize said coil on each engine cycle in response to said signal, a pressure transducer operatively positioned at said intake passage downstream of said throttle, said transducer being responsive to absolute pressure at said intake passage which pressure varies in accordance with throttle position and engine load, and means responsive to said pressure transducer to condition said circuit means to maintain said amplifier means conditioned to energize said coil for a variable period during each engine cycle established in accordance with changes in intake passage pressure produced by changes in engine load and throttle setting to thereby produce a recirculation rate proportional to engine air flow.

* * * * *